United States Patent
Kageyama et al.

(10) Patent No.: US 11,845,866 B2
(45) Date of Patent: Dec. 19, 2023

(54) RUBBER COMPOSITION FOR TIRE AND STUDLESS TIRE

(71) Applicant: The Yokohama Rubber Co., LTD., Tokyo (JP)

(72) Inventors: Hirokazu Kageyama, Hiratsuka (JP); Kazushi Kimura, Hiratsuka (JP); Satoshi Mihara, Hiratsuka (JP); Yutaro Yamamoto, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 596 days.

(21) Appl. No.: 16/980,361

(22) PCT Filed: Mar. 11, 2019

(86) PCT No.: PCT/JP2019/009684
§ 371 (c)(1),
(2) Date: Sep. 11, 2020

(87) PCT Pub. No.: WO2019/176854
PCT Pub. Date: Sep. 19, 2019

(65) Prior Publication Data
US 2021/0047501 A1    Feb. 18, 2021

(30) Foreign Application Priority Data
Mar. 12, 2018    (JP) ................. 2018-044379

(51) Int. Cl.
*C08L 9/00*     (2006.01)
*B60C 1/00*     (2006.01)
*B60C 11/00*    (2006.01)

(52) U.S. Cl.
CPC .............. *C08L 9/00* (2013.01); *B60C 1/0016* (2013.01); *B60C 11/0008* (2013.01); *C08L 2205/035* (2013.01)

(58) Field of Classification Search
CPC .... C08L 9/00; C08L 2205/035; B60C 1/0016; B60C 11/0008
See application file for complete search history.

(56) References Cited

U.S. PATENT DOCUMENTS

| | | | |
|---|---|---|---|
| 2016/0122518 A1* | 5/2016 | Tokimune | C08L 9/06 523/156 |
| 2017/0183483 A1* | 6/2017 | Kimura | C08K 3/04 |
| 2018/0072102 A1 | 3/2018 | Kato et al. | |

FOREIGN PATENT DOCUMENTS

| | | | |
|---|---|---|---|
| JP | 2004-035727 | 2/2004 | |
| JP | 2012-131920 | 7/2012 | |
| JP | 2014-055230 | 3/2014 | |
| JP | 2015-157879 | 9/2015 | |
| JP | 2016-023213 | 2/2016 | |
| JP | 2017-222736 | 12/2017 | |
| JP | 2017-222817 | 12/2017 | |
| KR | 10-2010-0107569 | 10/2010 | |
| WO | WO-2015178485 A1 * | 11/2015 | B60C 1/0016 |
| WO | WO 2016/167248 | 10/2016 | |

OTHER PUBLICATIONS

English machine translation of JP 2014-055230. (Year: 2014).*
International Search Report for International Application No. PCT/JP2019/009684 dated Jun. 11, 2019, 4 pages, Japan.

* cited by examiner

*Primary Examiner* — Angela C Scott
(74) *Attorney, Agent, or Firm* — Thorpe North & Western

(57) ABSTRACT

The present technology provide a rubber composition including: 100 parts by mass of a diene rubber, from 30 to 100 parts by mass of carbon black and/or a white filler, from 1 to 20 parts by mass of silicone-based microparticles that have an average particle size from 5 to 500 μm and that are three-dimensionally crosslinked, from 0.1 to 10 parts by mass of a nonionic surfactant, and from 1 to 20 parts by mass of thermally expanding microcapsules.

8 Claims, 1 Drawing Sheet

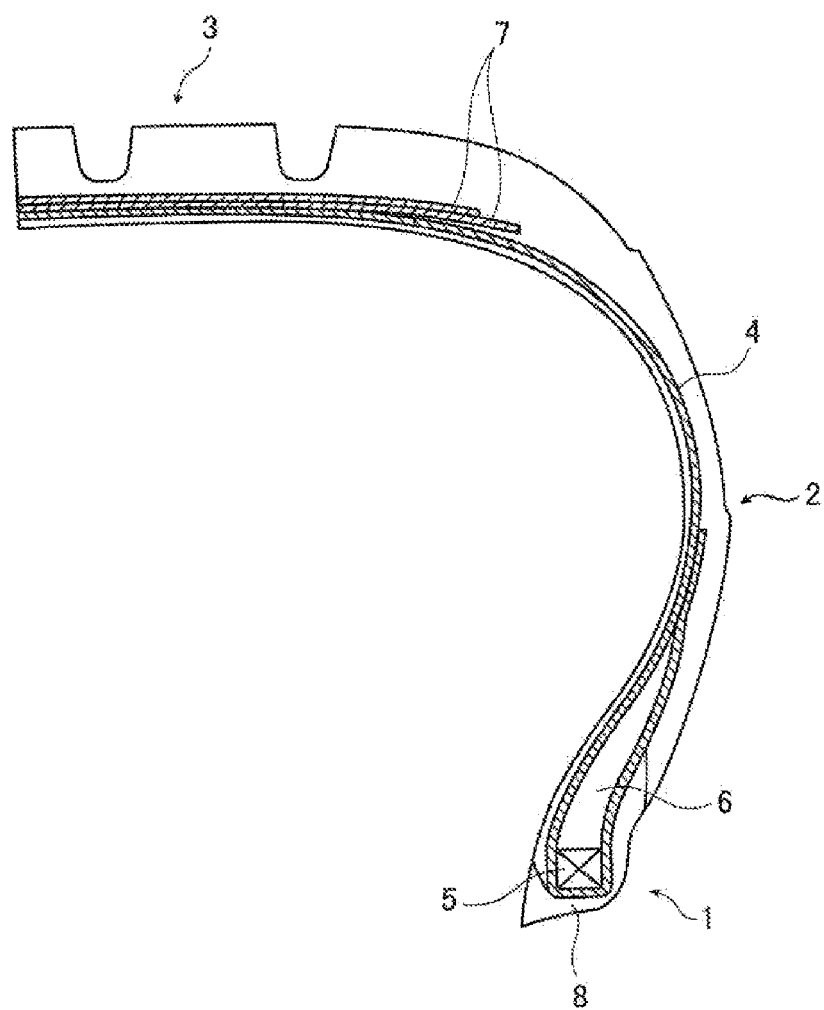

RUBBER COMPOSITION FOR TIRE AND STUDLESS TIRE

TECHNICAL FIELD

The present technology relates to a rubber composition for a tire and a studless tire.

BACKGROUND ART

In the related art, to enhance friction on ice of a studless tire, a rubber composition for a tire, the rubber composition containing silicone-based microparticles, has been studied.

For example, Japan Unexamined Patent Publication No. 2014-055230 discloses a rubber composition for a tire, the rubber composition containing a diene rubber and silicone-based microparticles. Japan Unexamined Patent Publication No. 2014-055230 describes that the rubber composition for a tire has excellent performance on ice.

As the required safety level is raised, further enhancement of performance on ice (braking ability on ice) of a studless tire has been demanded recently. Furthermore, achievement of this and wear resistance performance in a compatible manner has been also demanded.

In such circumstances, when the inventors of the present technology prepared a rubber composition for a tire, using an example of Japan Unexamined Patent Publication No. 2014-055230 as a reference, and evaluated the rubber composition, it was found that further enhancement of performance on ice and wear resistance performance is desired.

SUMMARY

The present technology provides: a rubber composition for a tire having excellent performance on ice and wear resistance performance; and a studless tire using the rubber composition for a tire.

The present technology uses a particular amount ratio of particular silicone-based microparticles, a nonionic surfactant, and thermally expanding microcapsules in combination.

Specifically, the present technology provides the following features.

(1) A rubber composition for a tire, the rubber composition containing:
  100 parts by mass of a diene rubber,
  from 30 to 100 parts by mass of carbon black and/or a white filler,
  from 1 to 20 parts by mass of silicone-based microparticles that have an average particle size from 5 to 500 µm and that are three-dimensionally crosslinked,
  from 0.1 to 10 parts by mass of a nonionic surfactant, and
  from 1 to 20 parts by mass of thermally expanding microcapsules.

(2) The rubber composition for a tire according to (1) above, where the diene rubber contains 30 mass % or greater of at least one rubber selected from the group consisting of a natural rubber (NR), an isoprene rubber (IR), a butadiene rubber (BR), an acrylonitrile-butadiene rubber (NBR), a styrene-butadiene rubber (SBR), a styrene-isoprene rubber (SIR), a styrene-isoprene-butadiene rubber (SIBR), and derivatives of each of these rubbers.

(3) The rubber composition for a tire according to (1) or (2) above, where the silicone-based microparticles are obtained by three-dimensionally crosslinking a silicone in a liquid polymer containing the nonionic surfactant.

(4) The rubber composition for a tire according to any one of (1) to (3) above, where the nonionic surfactant is a compound represented by Formula (d) below.

(5) A studless tire comprising a tire tread portion produced by using the rubber composition for a tire according to any one of (1) to (4) above.

As described below, according to an embodiment of the present technology, a rubber composition for a tire having excellent performance on ice and wear resistance performance; and a studless tire using the rubber composition for a tire can be provided.

BRIEF DESCRIPTION OF DRAWINGS

FIG. 1 is a partial cross-sectional schematic view of a studless tire according to an embodiment of the present technology.

DETAILED DESCRIPTION

The rubber composition for a tire according to an embodiment of the present technology and the studless tire using the rubber composition for a tire will be described below.

Note that, in the present specification, a numerical range indicated using "(from) . . . to . . . " include the former number as the lower limit value and the latter number as the upper limit value.

Furthermore, for each of the components contained in the rubber composition for a tire according to an embodiment of the present technology, one type may be used alone or two or more types may be used in combination. Here, in the case where two or more types of each component are used in combination, the content of such a component refers to a total content unless otherwise noted.

Rubber Composition for Tire

The rubber composition for a tire of an embodiment of the present technology (hereinafter, also referred to as "composition according to an embodiment of the present technology") contains: 100 parts by mass of a diene rubber, from 30 to 100 parts by mass of carbon black and/or a white filler, from 1 to 20 parts by mass of silicone-based microparticles that have an average particle size from 5 to 500 µm and that are three-dimensionally crosslinked, from 0.1 to 10 parts by mass of a nonionic surfactant, and from 1 to 20 parts by mass of thermally expanding microcapsules.

It is conceived that the composition according to an embodiment of the present technology can achieve the effect described above because of having such a configuration. Although the reason is not clear, it is assumed to be as follows.

As described above, the composition according to an embodiment of the present technology contains thermally expanding microcapsules. Here, the thermally expanding microcapsules achieve an effect of increasing frictional force on a road surface by absorbing water on ice; however, from the study of the present inventors, in the case where simply thermally expanding microcapsules are blended, it was found that water pickup effect of the thermally expanding microcapsules is insufficient because driving force for water to penetrate through the thermally expanding microcapsules is small.

Meanwhile, since the composition according to an embodiment of the present technology uses a particular amount ratio of silicone-based microparticles and a nonionic surfactant in combination in addition to the thermally expanding microcapsules, water on ice is efficiently guided into rubber by the nonionic surfactant, and the rubber deforms in a complicated manner during driving due to the presence of the silicone-based microparticles, and thus this serves as a driving force by which water is rapidly absorbed into the thermally expanding microcapsules. It is conceived that, as a result, the composition according to an embodiment of the present technology exhibits remarkably excellent performance on ice. Furthermore, it is conceived that, because each of the components described above are blended in a particular amount ratio, high homogeneity of the rubber composition and excellent wear resistance are achieved.

The components contained in the composition according to an embodiment of the present technology are described in detail below.

Diene Rubber

As described above, the composition according to an embodiment of the present technology contains a diene rubber.

Specific examples of the diene rubber include natural rubber (NR), isoprene rubber (IR), butadiene rubber (BR), acrylonitrile-butadiene rubber (NBR), styrene-butadiene rubber (SBR), styrene-isoprene rubber (SIR), styrene-isoprene-butadiene rubber (SIBR), butyl rubber (IIR), halogenated butyl rubber (Br-IIR, Cl-IIR), chloroprene rubber (CR), and derivatives of each of these rubbers.

As the diene rubber, from the perspective of achieving superior effect of an embodiment of the present technology, 30 mass % or greater of at least one of these rubbers is preferably contained.

From the perspective of achieving superior effect of an embodiment of the present technology, the diene rubber preferably contains natural rubber (NR) or butadiene rubber (BR), more preferably contains natural rubber (NR) and butadiene rubber (BR), and preferably contains from 30 to 70 mass % of natural rubber (NR) and from 30 to 70 mass % of butadiene rubber (BR), and more preferably contains from 40 to 60 mass % of natural rubber (NR) and from 40 to 60 mass % of butadiene rubber (BR).

The weight molecular weight (Mw) of the diene rubber is not particularly limited; however, from the perspective of achieving superior effect of an embodiment of the present technology, the weight molecular weight (Mw) is preferably from 100000 to 10000000, more preferably from 200000 to 1500000, and even more preferably from 300000 to 3000000.

Furthermore, the number average molecular weight (Mn) of the diene rubber is not particularly limited; however, from the perspective of achieving superior effect of an embodiment of the present technology, the number average molecular weight (Mn) is preferably from 50000 to 5000000, more preferably from 100000 to 750000, and even more preferably from 150000 to 1500000.

The Mw and/or Mn of at least one diene rubber contained in the diene rubber is preferably in the ranges described above, and the Mw and/or Mn of all diene rubbers contained in the diene rubber are more preferably in the ranges described above.

Note that, in the present specification, the Mw and Mn are values obtained by gel permeation chromatography (GPC) measurement, based on calibration with polystyrene standards, under the following conditions.

Solvent: Tetrahydrofuran
Detector: RI detector

Carbon Black and/or White Filler

As described above, the composition according to an embodiment of the present technology contains carbon black and/or a white filler. From the perspective of achieving superior effect of an embodiment of the present technology, the composition according to an embodiment of the present technology preferably contains both the carbon black and the white filler.

Carbon Black

The carbon black is not particularly limited, and for example, carbon blacks of various grades, such as SAF-HS (Super Abrasion Furnace-High Structure), SAF (Super Abrasion Furnace), ISAF-HS (Intermediate Super Abrasion Furnace-High Structure), ISAF (Intermediate Super Abrasion Furnace), ISAF-LS (Intermediate Super Abrasion Furnace-Low Structure), IISAF-HS (Intermediate Intermediate Super Abrasion Furnace-High Structure), HAF-HS (High Abrasion Furnace-High Structure), HAF (High Abrasion Furnace), HAF-LS (High Abrasion Furnace-Low Structure), FEF (Fast Extruding Furnace), GPF (General Purpose Furnace), and SRF (Semi-Reinforcing Furnace), can be used.

The nitrogen adsorption specific surface area ($N_2SA$) of the carbon black is not particularly limited; however, from the perspective of achieving superior effect of an embodiment of the present technology, the nitrogen adsorption specific surface area is preferably from 50 to 200 $m^2/g$ and more preferably from 70 to 150 $m^2/g$.

Note that the nitrogen adsorption specific surface area ($N_2SA$) is a value of the amount of nitrogen adsorbed to the surface of carbon black, measured in accordance with JIS (Japanese Industrial Standard) K6217-2:2001 (Part 2: Determination of specific surface area—Nitrogen adsorption methods—Single-point procedures).

White Filler

The white filler is not particularly limited, and examples thereof include silica, calcium carbonate, magnesium carbonate, talc, clay, alumina, aluminum hydroxide, titanium oxide, and calcium sulfate. Among these, from the perspective of achieving superior effect of an embodiment of the present technology, silica is preferred.

The silica is not particularly limited, and examples thereof include wet silica (hydrous silicic acid), dry silica (silicic anhydride), calcium silicate, and aluminum silicate. Among these, from the perspective of achieving superior effect of an embodiment of the present technology, silica is preferred.

The cetyltrimethylammonium bromide (CTAB) adsorption specific surface area of the silica is not particularly limited; however, from the perspective of achieving superior effect of an embodiment of the present technology, the CTAB adsorption specific surface area is preferably from 100 to 400 $m^2/g$, more preferably from 150 to 300 $m^2/g$, and even more preferably from 160 to 250 $m^2/g$.

Note that the CTAB adsorption specific surface area is a value of CTAB adsorbed amount to the surface of silica, measured in accordance with JIS K6217-3:2001 "Part 3: Method for determining specific surface area—CTAB adsorption method."

Content

In the composition according to an embodiment of the present technology, the content of the carbon black and/or the white filler (especially, silica) (total content in the case where the carbon black and the white filler are used in combination) is from 30 to 100 parts by mass per 100 parts by mass of the diene rubber described above. Among these, from the perspective of achieving superior effect of an embodiment of the present technology, the content is more preferably from 40 to 90 parts by mass and even more preferably from 45 to 80 parts by mass.

Furthermore, in the composition according to an embodiment of the present technology, from the perspective of achieving superior effect of an embodiment of the present technology, the content of the carbon black is preferably from 10 to 50 parts by mass, more preferably from 15 to 45 parts by mass, and even more preferably from 20 to 40 parts by mass, per 100 parts by mass of the diene rubber described above.

Furthermore, in the composition according to an embodiment of the present technology, from the perspective of achieving superior effect of an embodiment of the present technology, the content of the white filler (especially, silica) is preferably from 10 to 80 parts by mass, more preferably from 15 to 60 parts by mass, and even more preferably from 20 to 50 parts by mass, per 100 parts by mass of the diene rubber described above.

Particular Microparticles

As described above, the composition according to an embodiment of the present technology contains silicone-based microparticles that have an average particle size of from 5 to 500 μm and that are three-dimensionally crosslinked (hereinafter, also referred to as "particular microparticles").

Average Particle Size

From the perspective of achieving superior effect of an embodiment of the present technology, the average particle size of the particular microparticles is preferably from 5 to 100 μm and more preferably from 10 to 50 μm.

Note that the average particle size refers to the average value of the equivalent circle diameter measured using a laser microscope and, for example, can be measured by the laser diffraction scattering particle size distribution analyzer LA-300 (available from Horiba, Ltd.), laser microscope VK-8710 (available from Keyence Corporation), and the like.

Furthermore, "silicone-based microparticles" refers to microparticles having a siloxane bond in a main chain backbone and, for example, does not include microparticles that have a polyisoprene backbone and that are crosslinked by a siloxane bond (utilizing a hydrolyzable silyl group at a terminal).

First Preferred Embodiment

From the perspective of achieving superior effect of an embodiment of the present technology, the particular microparticles are preferably microparticles, in which a silicone is three-dimensionally crosslinked. From the perspective of achieving superior effect of an embodiment of the present technology, the crosslinking is not particularly limited but is preferably of a condensation type or addition type and is more preferably of a condensation type.

Silicone

The silicone is not particularly limited as long as the silicone is a compound having an organopolysiloxane as a main chain, and specific examples thereof include: polydimethylsiloxanes, methylhydrogenpolysiloxanes, methylphenylpolysiloxanes, diphenylpolysiloxanes, dimethylsilicone raw rubbers, methylvinylsilicone raw rubbers, methylphenylsilicone raw rubbers, and fluorosilicone raw rubbers. Among these, from the perspective of achieving superior effect of an embodiment of the present technology, polydimethylsiloxane is preferred.

Furthermore, from the perspective of achieving superior effect of an embodiment of the present technology, the silicone preferably contains a reactive functional group. Specific examples of the reactive functional group include a hydroxy group, mercapto group, silane functional group, isocyanate group, (meth)acryloyl group, allyl group, carboxy group, acid anhydride group, and epoxy group.

Note that the silane functional group is also referred to as a crosslinkable silyl group. Specific examples thereof include: a hydrolyzable silyl group; a silanol group; functional groups in which a silanol group is substituted with an acetoxy group derivative, enoxy group derivative, oxime group derivative, amine group derivative, or the like; and the like.

From the perspective of achieving superior effect of an embodiment of the present technology, the reactive functional group is preferably a hydroxy group, silane functional group, carboxy group, or acid anhydride group and is more preferably a silane functional group (especially, silanol group).

Examples of commercially available products of silicone having such a reactive functional group include: a modified polydimethylsiloxane capped with silanol at both terminals represented by Formula (2) below [SS-10 (m=336, in the formula), KF-9701 (m=38, in the formula), X-21-5841 (m=11, in the formula), all available from Shin-Etsu Chemical Co., Ltd.]; and a modified polydimethylsiloxane capped with carboxy at both terminals (X-22-162C, available from Shin-Etsu Chemical Co., Ltd.).

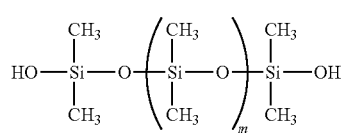

(2)

From the perspective of achieving superior effect of an embodiment of the present technology, the reactive functional group is preferably contained at at least a terminal of the main chain of the silicone. In the case where the main chain is a straight chain, from the perspective of achieving superior effect of an embodiment of the present technology, preferably 1.5 or more and more preferably 2 or more of the reactive functional groups are contained. On the other hand, in the case where the main chain is branched, 3 or more reactive functional groups are preferably contained from the perspective of achieving superior effect of an embodiment of the present technology.

The weight average molecular weight (Mw) and the number average molecular weight (Mn) of the silicone are not particularly limited but are preferably from 1000 to 100000 and more preferably from 3000 to 60000, from the perspective of achieving superior effect of an embodiment of the present technology.

Three-Dimensional Crosslinking

Examples of the method for three-dimensionally crosslinking the silicone described above include: a method of vulcanizing by a vulcanizing agent and a method of three-dimensionally crosslinking by using the reactive functional group described above.

Specific examples of the method of vulcanizing by a vulcanizing agent include a method of using a silicone raw rubber as a silicone and vulcanizing this by an organic peroxide.

Furthermore, specific examples of the method of three-dimensionally crosslinking by using the reactive functional group include a method of subjecting, to a reaction, a silicone having a reactive functional group; and at least one component selected from the group consisting of water, catalysts, polymerization initiators, and compounds having a functional group that reacts with the reactive functional group, to perform three-dimensional crosslinking.

Note that the method for three-dimensionally crosslinking the silicone described above is not limited to these methods and, for example, also includes methods of crosslinking by: an electron beam curing; neutron and proton formed from heavy hydrogen accelerated by cyclotron; and X-ray from γ-ray target from cobalt 60.

Specific example of the organic peroxide include: benzoyl peroxide, 2,4-dichlorobenzoyl peroxide, dicumyl peroxide, 2,5-dimethyl-2,5-bis(tert-butylperoxy)hexane, p-chlorobenzoyl peroxide, di-tert-butyl peroxide, and tert-butylperbenzoate. One type of these may be used alone, or two or more types thereof may be used in combination, depending on temperature and use condition.

Furthermore, the water can be suitably used when the silicone contains a hydrolyzable silyl group, isocyanate group, or acid anhydride group as a reactive functional group.

Furthermore, examples of the catalyst include a condensation catalyst.

Specific examples of the condensation catalyst include: dibutyltin dilaurate, dibutyltin dioleate, dibutyltin diacetate, tetrabutyl titanate, tin(II) octanoate, and octyltin compounds.

Furthermore, the polymerization initiator can be suitably used in the case where the silicone contains a (meth)acryloyl group or in the case where a mercapto group and an unsaturated double bond are contained, and specific examples thereof include radical polymerization initiators, such as azobisisobutyronitrile and benzoyl peroxide.

Note that the three-dimensional crosslinking using such a polymerization initiator can be proceeded by, besides ultraviolet light curing, addition reaction using a platinum catalyst; or cationic polymerization using an onium salt catalyst.

Furthermore, examples of the compound having a functional group that reacts with the reactive functional group include: condensation-type curing agents and hydrosilane compounds.

Examples of the condensation-type curing agents include, in addition to acetic acid-type curing agent that causes a condensation reaction by deacetylation, alcohol-type, oxime-type, amine-type, amide-type, aminooxy-type, acetone-type, hydroxylamine-type, hydrogen-type, and dehydration-type curing agents, and these can be suitably used.

Among these, an alcohol-type curing agent that causes a condensation reaction by dealcoholization is preferred, and specific preferred examples include: alkoxysilanes (e.g. vinyltrimethoxysilane), methyl silicate oligomers, and organosiloxane oligomers.

Furthermore, the hydrosilane compound is a compound having an SiH group and can be suitably used when the silicone described above contains an allyl group as a reactive functional group.

Specific examples of the hydrosilane compound include 1,1,3,3-tetramethyldisiloxane, 1,3,5,7-tetramethyltetracyclosiloxane, 1,3,5,7,8-pentamethylpentacyclosiloxane, and the like.

Note that, in the case where the hydrosilane compound is used, a catalyst that promotes a reaction with a silicone having an allyl group (e.g. metal complex catalyst selected from Group VIII transition metal elements, such as platinum, rhodium, cobalt, palladium, and nickel) can be used.

Second Preferred Embodiment

As described above, from the perspective of achieving superior effect of an embodiment of the present technology, the particular microparticles are preferably microparticles, in which a silicone is three-dimensionally crosslinked (first preferred embodiment). Among these, from the perspective of achieving superior effect of an embodiment of the present technology, microparticles, in which a silicone is three-dimensionally crosslinked in a liquid polymer containing a nonionic surfactant (second preferred embodiment), are more preferred.

In the case where the microparticles, in which a silicone is three-dimensionally crosslinked in a liquid polymer containing a nonionic surfactant, are used as the particular microparticles, superior performance on ice and wear resistance performance are achieved.

The reason for this effect being obtained is not clear, but it is conceived that the homogeneity of the crosslinked structure is enhanced by three-dimensionally crosslinking the silicone while the nonionic surfactant coexists. However, identifying the specific structure thereof is not possible or not practical.

In the second preferred embodiment, the silicone and the three-dimensionally crosslinking are identical to those of sirst preferred embodiment.

Liquid Polymer

The liquid polymer is not particularly limited, and specific examples thereof include liquid polybutadienes, liquid polystyrene butadienes, and liquid polyisoprenes. Among these, from the perspective of achieving superior effect of an embodiment of the present technology, a liquid polyisoprene is preferred.

The number average molecular weight (Mn) of the liquid polymer is preferably 1000 or greater and less than 50000, more preferably from 5000 to 40000, and even more preferably from 10000 to 30000, from the perspective of achieving superior effect of an embodiment of the present technology.

Nonionic Surfactant

Specific examples and preferred embodiments of the nonionic surfactant are identical to those of nonionic surfactant described below.

In second preferred embodiment, the content of the nonionic surfactant in the liquid polymer is not particularly limited but is preferably from 1 to 30 mass %, more preferably from 2 to 20 mass %, and even more preferably from 3 to 10 mass %, from the perspective of achieving superior effect of an embodiment of the present technology.

Content

In the composition according to an embodiment of the present technology, the content of the particular microparticles is from 1 to 20 parts by mass per 100 parts by mass of the diene rubber described above. Among these, from the perspective of achieving superior effect of an embodiment of the present technology, the content is preferably from 2 to 15 parts by mass and even more preferably from 3 to 10 parts by mass.

Nonionic Surfactant

As described above, the composition according to an embodiment of the present technology contains a nonionic surfactant.

The nonionic surfactant is not particularly limited, and specific examples thereof include: sorbitan fatty acid esters, polyoxyethylene sorbitan fatty acid esters, polyoxyethylene higher alcohol ethers, polyoxyethylene-propylene higher alcohol ethers, polyoxyethylene fatty acid esters, polyoxyethylene alkylphenols, polyoxyethylene aliphatic hydrocarbon amines (e.g. polyoxyethylene alkylamines, polyoxyethylene alkylene amines), polyoxyethylene aliphatic hydrocarbon amides (e.g. polyoxyethylene alkylamides, polyoxyethylene alkylene amides), polyoxyethylene-polyoxypropylene block polymers, and silicone-based foam stabilizers. Among these, from the perspective of achieving superior effect of an embodiment of the present technology, a silicone-based foam stabilizer is preferred, and a compound represented by Formula (d) below is more preferred.

Particular Foam Stabilizer

As described above, from the perspective of achieving superior effect of an embodiment of the present technology, the nonionic surfactant is preferably a compound represented by Formula (d) below (hereinafter, also referred to as "particular foam stabilizer").

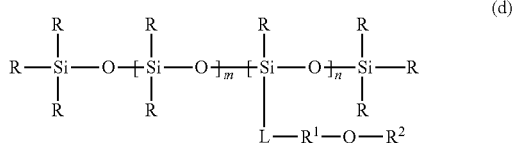

(d)

In Formula (d) above, R represents a hydrocarbon group, L represents a single bond or a divalent linking group, $R^1$ represents a polyalkylene oxide group ($—(R^{11}O)_{a+b}—$: $R^{11}$ represents an alkylene group, and a+b represents an integer of 2 or greater. a plurality of the $R^{11}$ moieties may be the same or different), $R^2$ represents a hydrocarbon group, and m and n each independently represents an integer of 1 or greater.

The plurality of the R moieties may be the same or different. In the case where n is an integer of 2 or greater, a plurality of the L moieties, a plurality of the $R^1$ moieties, and a plurality of the $R^2$ moieties may be the same or different.

As described above, in Formula (d) above, R represents a hydrocarbon group.

Examples of the hydrocarbon group include aliphatic hydrocarbon groups, aromatic hydrocarbon groups, and groups that have a combination of these. The aliphatic hydrocarbon group may be in a form of straight-chain, branched-chain, or ring. Specific examples of the aliphatic hydrocarbon group include: straight-chain or branched alkyl groups (preferably having from 1 to 10 carbons), straight-chain or branched alkenyl groups (preferably having from 2 to 10 carbons), and straight-chain or branched alkynyl groups (preferably having from 2 to 10 carbons). Examples of the aromatic hydrocarbon group include aryl groups, and naphthyl groups. Examples of the aryl group include a phenyl group, tolyl group, and xylyl group. Among these, from the perspective of achieving superior effect of an embodiment of the present technology, an aliphatic hydrocarbon group having from 1 to 10 carbons (preferably having from 1 to 3 carbons) is preferable.

As described above, in Formula (d) above, L represents a single bond or a divalent linking group.

Examples of the divalent linking group include divalent aliphatic hydrocarbon groups (e.g. alkylene group, preferably having from 1 to 8 carbons), divalent aromatic hydrocarbon groups (e.g. arylene group, preferably having from 6 to 12 carbons), —O—, —S—, —SO$_2$—, —N(R)— (R: alkyl group), —CO—, —NH—, —COO—, —CONH—, and groups that have a combination of these (e.g. alkyleneoxy groups, alkyleneoxycarbonyl groups, and alkylenecarbonyloxy groups).

As described above, in Formula (d) above, $R^1$ represents a polyalkylene oxide group.

The polyalkylene oxide group is represented by $—(R^{11}O)_{a+b}—$.

Here, $R^{11}$ represents an alkylene group (preferably having from 1 to 5 carbons). Furthermore, a+b represents an integer of 2 or greater. A plurality of the $R^{11}$ moieties may be the same or different.

From the perspective of achieving superior effect of an embodiment of the present technology, the polyalkylene oxide group is preferably a group represented by $—(CH_2CH_2O)_a—(CH_2CH(CH_3)O)_b—$.

Here, a and b each independently represent an integer of 0 or greater. However, a+b represents an integer of 2 or greater. Note that a and b respectively represent a total number of ($CH_2CH_2O$) present in the group and a total number of ($CH_2CH(CH_3)O$) present in the group, and the order of ($CH_2CH_2O$) and ($CH_2CH(CH_3)O$) can be freely set.

As described above, in Formula (d) above, $R^2$ represents a hydrocarbon group. Specific examples of the hydrocarbon group include those given above.

As described above, m and n each independently represent an integer of 1 or greater.

Content

The content of the nonionic surfactant is from 0.1 to 10 parts by mass per 100 parts by mass of the diene rubber described above. Among these, from the perspective of achieving superior effect of an embodiment of the present technology, the content is more preferably from 0.5 to 8 parts by mass and even more preferably from 1 to 5 parts by mass.

Thermally Expanding Microcapsules

As described above, the composition according to an embodiment of the present technology contains thermally expanding microcapsules.

The thermally expanding microcapsules are formed from thermoplastic resin particles containing a substance that vaporizes or expands by heat to generate a gas. Note that the thermally expanding microcapsules are formed as microcapsules in which a gas is sealed in an outer shell formed from the thermoplastic resin by heating at a temperature (e.g., from 130 to 190° C.) that is equal to or higher than the initiation temperature of vaporization or expansion of the substance.

Although the particle size before expansion of the thermally expanding microcapsules is preferably from 5 to 300 μm and more preferably from 10 to 200 μm.

As the thermoplastic resin, for example, polymers of (meth)acrylonitrile and/or copolymers having a high (meth)acrylonitrile content are suitably used. As another monomer (comonomer) in the case of a copolymer, monomers such as vinyl halides, vinylidene halides, styrene-based monomers, (meth)acrylate-based monomers, vinyl acetate, butadiene, vinyl pyridine, and chloroprene are used.

Note that the thermoplastic resin may be crosslinkable by a crosslinking agent, such as divinylbenzene, ethylene glycol di(meth)acrylate, triethylene glycol di(meth)acrylate, trimethylolpropane tri(meth)acrylate, 1,3-butylene glycol di(meth)acrylate, allyl (meth) acrylate, triacrylformal, and triallyl isocyanurate. Regarding the crosslinking form, an uncrosslinked form is preferred; however, partial crosslinking may be performed to a degree that does not impair the properties as a thermoplastic resin.

Specific examples of the substance that vaporizes or expands by heat to generate a gas contained in the thermally expanding microcapsules include: liquids such as hydrocarbons, such as n-pentane, isopentane, neopentane, butane, isobutane, hexane, and petroleum ether; and chlorinated hydrocarbons, such as methyl chloride, methylene chloride, dichloroethylene, trichloroethane, and trichloroethylene; or solids such as azodicarbonamide, dinitrosopentamethylenetetramine, azobisisobutyronitrile, toluenesulfonyl hydrazide derivatives, and aromatic succinyl hydrazide derivatives.

As such thermally expanding microcapsules, a commercially available product may be used. Such as, for example, trade names "Expancel 091DU-80" and "Expancel 092DU-120" available from Expancel in Sweden, and trade names "Matsumoto Microsphere F-85", "Matsumoto Microsphere F-100", and "Matsumoto Microsphere F-100D", available from Matsumoto Yushi-Seiyaku Co., Ltd are available.

In the composition according to an embodiment of the present technology, the content of the thermally expanding microcapsules is from 1 to 20 parts by mass per 100 parts by mass of the diene rubber described above. Among these, from the perspective of achieving superior effect of an embodiment of the present technology, the content is preferably from 2 to 15 parts by mass and even more preferably from 3 to 10 parts by mass.

Amount Ratio of Each Component

In the composition according to an embodiment of the present technology, the ratio of the content of the nonionic surfactant to the content of the particular microparticles (content of nonionic surfactant/content of particular microparticles) is preferably from 1 to 100 mass %, more preferably from 2 to 20 mass %, and even more preferably from 5 to 15 mass %, from the perspective of achieving superior effect of an embodiment of the present technology.

In the composition according to an embodiment of the present technology, the ratio of the content of the thermally expanding microcapsules to the content of the particular microparticles (content of thermally expanding microcapsules/content of particular microparticles) is preferably from 50 to 200 mass %, more preferably from 80 to 120 mass %, and even more preferably from 90 to 110 mass %, from the perspective of achieving superior effect of an embodiment of the present technology.

In the composition according to an embodiment of the present technology, the ratio of the total content of the nonionic surfactant and the thermally expanding microcapsules to the content of the particular microparticles (total content of nonionic surfactant and thermally expanding microcapsules/content of particular microparticles) is preferably from 50 to 500 mass %, more preferably from 80 to 200 mass %, even more preferably from 90 to 150 mass %, and particularly preferably from 105 to 115 mass %, from the perspective of achieving superior effect of an embodiment of the present technology.

Optional Component

The composition according to an embodiment of the present technology may contain another component (optional component) besides the components described above, as necessary.

Examples of such a component include various additives that are typically used in rubber compositions, such as silane coupling agents, terpene resins (preferably aromatic modified terpene resins), zinc oxide (flower of zinc), stearic acid, anti-aging agents, waxes, processing aids, process oils, liquid polymers, thermosetting resins, vulcanizing agents (e.g. sulfur), and vulcanization accelerators.

Studless Tire

The studless tire according to an embodiment of the present technology is a studless tire produced using the composition according to an embodiment of the present technology described above. Especially, the studless tire is preferably a studless tire having a tire tread portion produced by using the composition according to an embodiment of the present technology.

FIG. 1 is a partial cross-sectional schematic view of a studless tire that represents a studless tire according to an embodiment of the present technology, but the studless tire according to an embodiment of the present technology is not limited to the embodiment illustrated in FIG. 1.

In FIG. 1, reference sign 1 denotes a bead portion, reference sign 2 denotes a sidewall portion, and reference sign 3 denotes a tire tread portion.

In addition, a carcass layer 4, in which fiber cords are embedded, is mounted between a left-right pair of the bead portions 1, and ends of the carcass layer 4 are turned up around bead cores 5 and bead fillers 6 from an inner side to an outer side of the tire.

In the tire tread portion 3, a belt layer 7 is provided along the entire circumference of the tire on the outer side of the carcass layer 4.

Additionally, rim cushions 8 are provided in portions of the bead portions 1 that are in contact with a rim.

Note that the tire tread portion 3 is formed from the composition according to an embodiment of the present technology described above.

The studless tire according to an embodiment of the present technology can be produced, for example, in accordance with a known method. In addition to ordinary air or air with an adjusted oxygen partial pressure, inert gases such as nitrogen, argon, and helium can be used as the gas with which the studless tire according to an embodiment of the present technology is filled.

Example

The present technology is described in further detail below by using examples. However, the present technology is not limited to these examples.

Production of Particular Microparticles

As described below, particular microparticles 1 to 6 were produced.

Particular Microparticles 1

In a three-necked flask equipped with a stirring blade, 100 g of a modified polydimethylsiloxane capped with silanol at a terminal (SS-10; Mw: 42000; available from Shin-Etsu Chemical Co., Ltd.), 5 g of vinyltrimethoxysilane (KBM1003; available from Shin-Etsu Chemical Co., Ltd.), and 0.5 g of an organotin compound (Neostann U-130; available from Nitto Kasei Co., Ltd.) were mixed. Then, 150 g of a liquid polybutadiene (L-BR-307 CN; number average molecular weight: 8000; available from Kuraray Co., Ltd.) as a liquid polymer and 0.2 g of water were added and stirred at room temperature for 30 minutes.

The product was a mixture of the silicone-based microparticles (three-dimensionally crosslinked silicone-based microparticles obtained by subjecting, to condensation, a modified polydimethylsiloxane capped with silanol at a terminal; and vinyltrimethoxysilane) and the liquid polybutadiene. When observed by a microscope, the particle size of the silicone-based microparticles was approximately from 10 μm to 100 μm, and the particle size was inconstant (uneven). The obtained silicone-based microparticles were used as the particular microparticles 1.

Particular Microparticles 2

In a three-necked flask equipped with a stirring blade, 100 g of a modified polydimethylsiloxane capped with silanol at a terminal (SS-10; available from Shin-Etsu Chemical Co., Ltd.), 5 g of vinyltrimethoxysilane (KBM1003; available from Shin-Etsu Chemical Co., Ltd.), 10 g of a silicone-based foam stabilizer L-5345 (compound represented by Formula (d1) below; available from Momentive Performance Materials Japan LLC.) (corresponding to the particular foam stabilizer described above) as a nonionic surfactant, and 0.5 g of an organotin compound (Neostann U-130; available from Nitto Kasei Co., Ltd.) were mixed. Then, 150 g of a liquid polybutadiene (L-BR-307 CN; number average molecular weight: 8000; available from Kuraray Co., Ltd.) as a liquid polymer and 0.2 g of water were added and stirred at room temperature for 30 minutes.

The product was a mixture of the silicone-based microparticles (three-dimensionally crosslinked silicone-based microparticles obtained by subjecting, to condensation, a modified polydimethylsiloxane capped with silanol at a terminal; and vinyltrimethoxysilane), the nonionic surfactant, and the liquid polybutadiene. When observed by a microscope, the particle size of the silicone-based microparticles was approximately from 5 μm to 20 μm. The obtained silicone-based microparticles were used as the particular microparticles 2.

Particular Microparticles 4

In a three-necked flask equipped with a stirring blade, 100 g of a modified polydimethylsiloxane capped with silanol at a terminal (SS-10; available from Shin-Etsu Chemical Co., Ltd.), 5 g of vinyltrimethoxysilane (KBM1003; available from Shin-Etsu Chemical Co., Ltd.), 10 g of a silicone-based foam stabilizer L-6164 (available from Momentive Performance Materials Japan LLC.) as a nonionic surfactant, and 0.5 g of an organotin compound (Neostann U-130; available from Nitto Kasei Co., Ltd.) were mixed. Then, 150 g of a liquid polyisoprene (L-IR-30; number average molecular weight: 28000; available from Kuraray Co., Ltd.) as a liquid polymer and 0.2 g of water were added and stirred at room temperature for 30 minutes.

The product was a mixture of the silicone-based microparticles (three-dimensionally crosslinked silicone-based microparticles obtained by subjecting, to condensation, a modified polydimethylsiloxane capped with silanol at a terminal; and vinyltrimethoxysilane), the nonionic surfactant, and the liquid polyisoprene. When observed by a microscope, the particle size of the silicone-based micropar-

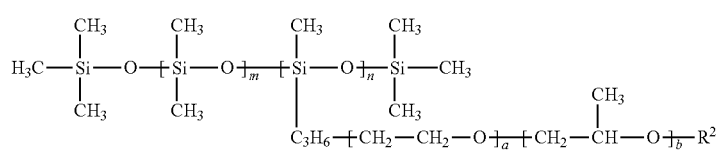

(d1)

In Formula (d1) above, m is an integer of 1 or greater, n is an integer of 1 or greater, a is an integer of 0 or greater, b is an integer of 0 or greater, and $R^2$ is an alkyl group. However, a+b represents an integer of 2 or greater. Note that a and b respectively represent a total number of $(CH_2CH_2O)$ present in the group and a total number of $(CH_2CH(CH_3)O)$ present in the group, and the order of $(CH_2CH_2O)$ and $(CH_2CH(CH_3)O)$ can be freely set.

Particular Microparticles 3

In a three-necked flask equipped with a stirring blade, 100 g of a modified polydimethylsiloxane capped with silanol at a terminal (SS-10; available from Shin-Etsu Chemical Co., Ltd.), 5 g of vinyltrimethoxysilane (KBM1003; available from Shin-Etsu Chemical Co., Ltd.), 10 g of a silicone-based foam stabilizer L-6164 (compound represented by Formula (d1) above; available from Momentive Performance Materials Japan LLC.) (corresponding to the particular foam stabilizer described above) as a nonionic surfactant, and 0.5 g of an organotin compound (Neostann U-130; available from Nitto Kasei Co., Ltd.) were mixed. Then, 150 g of a liquid polybutadiene (L-BR-307 CN; number average molecular weight: 8000; available from Kuraray Co., Ltd.) as a liquid polymer and 0.2 g of water were added and stirred at room temperature for 30 minutes.

The product was a mixture of the silicone-based microparticles (three-dimensionally crosslinked silicone-based microparticles obtained by subjecting, to condensation, a modified polydimethylsiloxane capped with silanol at a terminal; and vinyltrimethoxysilane), the nonionic surfactant, and the liquid polybutadiene. When observed by a microscope, the particle size of the silicone-based microparticles was approximately from 5 μm to 20 μm. The obtained silicone-based microparticles were used as the particular microparticles 3.

ticles was approximately from 10 μm to 30 μm. The obtained silicone-based microparticles were used as the particular microparticles 4.

Particular Microparticles 5

In a three-necked flask equipped with a stirring blade, 100 g of a modified polydimethylsiloxane capped with silanol at a terminal (SS-10; available from Shin-Etsu Chemical Co., Ltd.), 5 g of vinyltrimethoxysilane (KBM1003; available from Shin-Etsu Chemical Co., Ltd.), 2 g of a silicone-based foam stabilizer L-6164 (available from Momentive Performance Materials Japan LLC.) as a nonionic surfactant, and 0.5 g of an organotin compound (Neostann U-130; available from Nitto Kasei Co., Ltd.) were mixed. Then, 150 g of a liquid polyisoprene (L-IR-30; number average molecular weight: 28000; available from Kuraray Co., Ltd.) as a liquid polymer and 0.2 g of water were added and stirred at room temperature for 30 minutes.

The product was a mixture of the silicone-based microparticles (three-dimensionally crosslinked silicone-based microparticles obtained by subjecting, to condensation, a modified polydimethylsiloxane capped with silanol at a terminal; and vinyltrimethoxysilane), the nonionic surfactant, and the liquid polyisoprene. When observed by a microscope, the particle size of the silicone-based microparticles was approximately from 10 μm to 30 μm. The obtained silicone-based microparticles were used as the particular microparticles 5.

Particular Microparticles 6

In a three-necked flask equipped with a stirring blade, 100 g of a modified polydimethylsiloxane capped with silanol at a terminal (SS-10; available from Shin-Etsu Chemical Co., Ltd.), 5 g of vinyltrimethoxysilane (KBM1003; available from Shin-Etsu Chemical Co., Ltd.), 20 g of a silicone-based foam stabilizer L-6164 (available from Momentive Performance Materials Japan LLC.) as a nonionic surfactant, and 0.5 g of an organotin compound (Neostann U-130; available from Nitto Kasei Co., Ltd.) were mixed. Then, 150 g of a liquid polyisoprene (L-IR-30; number average molecular weight: 28000; available from Kuraray Co., Ltd.) as a liquid polymer and 0.2 g of water were added and stirred at room temperature for 30 minutes.

The product was a mixture of the silicone-based microparticles (three-dimensionally crosslinked silicone-based microparticles obtained by subjecting, to condensation, a modified polydimethylsiloxane capped with silanol at a terminal; and vinyltrimethoxysilane), the nonionic surfactant, and the liquid polybutadiene). When observed by a microscope, the particle size of the silicone-based microparticles was approximately from 10 μm to 30 μm. The obtained silicone-based microparticles were used as the particular microparticles 6.

Preparation of Rubber Composition for Tire

The components shown in the following Table 1 were blended at the proportions (parts by mass) shown in the table. Specifically, a master batch was obtained by first kneading the components, except for the sulfur and the vulcanization accelerator, for 5 minutes in a 1.7-L sealed mixer and then discharging the kneaded product when the temperature reached 150° C. Next, a rubber composition for a tire (Examples and Comparative Examples) was obtained by kneading the sulfur and the vulcanization accelerator with the obtained master batch using an open roll.

Note that, in the section of particular microparticles of Table 1 below, the numbers in parentheses show, from the left, parts by mass of the silicone-based microparticles, parts by mass of the nonionic surfactant, and parts by mass of the liquid polymer. For example, for the particular microparticles 2, the net parts by mass of the particular microparticles 2 in the particular microparticles 2 (12.5 parts by mass) is 5 parts by mass, and 0.5 parts by mass among the rest of the 7.5 parts by mass is the nonionic surfactant, and 7 parts by mass is the liquid polymer (liquid polybutadiene).

Production of Vulcanized Rubber Sheet

A vulcanized rubber sheet was produced by vulcanizing (170° C., 15 minutes) the obtained rubber composition for a tire in a mold for Lambourn abrasion (disk having a diameter of 63.5 mm and a thickness of 5 mm).

Evaluation

The following evaluations were performed using the obtained vulcanized rubber sheet.

Performance on Ice

The obtained vulcanized rubber sheet was adhered to a flat cylindrical rubber base, and a coefficient of friction on ice was measured using an inside drum frictional force on ice tester. The measurement temperature was −1.5° C., the load was 5.5 g/cm$^3$, and the drum rotation speed was 25 km/hr.

The results are shown in Table 1. The results are expressed as index values with Comparative Example 1 being assigned the index value of 100. A larger index value indicates a greater frictional force on ice and superior performance on ice. Practically, the index value is preferably 107 or greater.

Wear Resistance Performance

For the obtained vulcanized rubber sheet, amount of wear was measured in accordance with JIS K6264-1, 2:2005 using a Lambourn abrasion tester (available from Iwamoto Seisakusho Co. Ltd.) at a temperature of 20° C. and at a slip ratio of 50%. The index value was calculated based on the following equation.

The results are shown in Table 1. A larger index value indicates a smaller amount of wear and superior wear resistance performance. Practically, the index value is preferably 101 or greater.

Index value=(amount of wear of Comparative Example 1/amount of wear of each vulcanized rubber sheet)×100

TABLE 1

|  | Comparative Example 1 | Comparative Example 2 | Comparative Example 3 | Comparative Example 4 |
|---|---|---|---|---|
| NR | 50 | 50 | 50 | 50 |
| BR | 50 | 50 | 50 | 50 |
| Carbon black | 35 | 35 | 35 | 35 |
| Silica | 25 | 25 | 25 | 25 |
| Thermally expanding microcapsule |  | 5 | 5 | 5 |
| Particular microparticles 1 |  |  |  | 12 (5/0/7) |
| Particular microparticles 2 |  |  |  |  |
| Particular microparticles 3 |  |  |  |  |
| Particular microparticles 4 |  |  |  |  |
| Particular microparticles 5 |  |  |  |  |
| Particular microparticles 6 |  |  |  |  |
| Silicone oligomer |  |  | 5 |  |
| Zinc oxide | 4 | 4 | 4 | 4 |
| Stearic acid | 2 | 2 | 2 | 2 |
| Anti-aging agent | 2 | 2 | 2 | 2 |
| Wax | 2 | 2 | 2 | 2 |
| Oil | 20 | 15 | 15 | 15 |
| Sulfur | 1.5 | 1.5 | 1.5 | 1.5 |
| Vulcanization accelerator | 1.5 | 1.5 | 1.5 | 1.5 |
| Performance on ice | 100 | 106 | 105 | 106 |
| Wear resistance performance | 100 | 94 | 97 | 100 |

|  | Example 1 | Example 2 | Example 3 | Example 4 | Example 5 |
|---|---|---|---|---|---|
| NR | 50 | 50 | 50 | 50 | 50 |
| BR | 50 | 50 | 50 | 50 | 50 |
| Carbon black | 35 | 35 | 35 | 35 | 35 |

TABLE 1-continued

| | | | | | |
|---|---|---|---|---|---|
| Silica | 25 | 25 | 25 | 25 | 25 |
| Thermally expanding microcapsule | 5 | 5 | 5 | 5 | 5 |
| Particular microparticles 1 | | | | | |
| Particular microparticles 2 | 12.5 (5/0.5/7) | | | | |
| Particular microparticles 3 | | 12.5 (5/0.5/7) | | | |
| Particular microparticles 4 | | | 12.5 (5/0.5/7) | | |
| Particular microparticles 5 | | | | 12.1 (5/0.1/7) | |
| Particular microparticles 6 | | | | | 13 (5/1/7) |
| Silicone oligomer | | | | | |
| Zinc oxide | 4 | 4 | 4 | 4 | 4 |
| Stearic acid | 2 | 2 | 2 | 2 | 2 |
| Anti-aging agent | 2 | 2 | 2 | 2 | 2 |
| Wax | 2 | 2 | 2 | 2 | 2 |
| Oil | 15 | 15 | 15 | 15 | 15 |
| Sulfur | 1.5 | 1.5 | 1.5 | 1.5 | 1.5 |
| Vulcanization accelerator | 1.5 | 1.5 | 1.5 | 1.5 | 1.5 |
| Performance on ice | 115 | 110 | 116 | 111 | 113 |
| Wear resistance performance | 104 | 102 | 105 | 102 | 103 |

The details of each component shown in Table 1 above are as follows.

Note that the particular microparticles 1 to 6 correspond to the particular microparticles described above because the particular microparticles 1 to 6 are silicone-based microparticles that have an average particle size from 5 to 500 μm and that are three-dimensionally crosslinked.

Furthermore, NR and BR each have a number average molecular weight of 50000 or greater.

NR: Natural rubber (STR 20, available from Von Bundit Co., Ltd.; glass transition temperature: −65° C.)

BR: Butadiene rubber (Nipol BR1220, available from Zeon Corporation; glass transition temperature: −110° C.)

Carbon black: Show Black N339 (available from Cabot Japan K.K.)

Silica: ULTRASIL VN3 (available from Evonik Degussa)

Thermally expanding microcapsules: Matsumoto Microsphere F (available from Matsumoto Yushi-Seiyaku Co., Ltd.)

Particular microparticles 1 to 6: Particular microparticles 1 to 6 produced as described above (including the nonionic surfactant and the liquid polymer)

Silicone oligomer: Modified polydimethylsiloxane capped with silanol at a terminal (SS-10, available from Shin-Etsu Chemical Co., Ltd.)

Zinc oxide: Zinc Oxide III (available from Seido Chemical Industry Co., Ltd.)

Stearic acid: Beads stearic acid YR (available from Nippon Oil & Fats Co., Ltd.)

Anti-aging agent: Amine-based anti-aging agent (Santflex 6PPD, available from Flexsys)

Wax: Paraffin wax (available from Ouchi Shinko Chemical Industrial Co., Ltd.)

Oil: Aroma oil (Extract 4S, available from Showa Shell Sekiyu K.K.)

Sulfur: 5% Oil-treated sulfur (available from Hosoi Chemical Industry Co., Ltd.)

Vulcanization accelerator: Sulfenamide-based vulcanization accelerator (Sanceller CM-G, available from Sanshin Chemical Industry Co., Ltd.)

As is clear from Table 1, Examples 1 to 5, which use a particular amount ratio of the particular microparticles, the nonionic surfactant, and the thermally expanding microcapsules in combination, each exhibit excellent performance on ice and wear resistance performance. Note that, in Examples 1 to 5, the nonionic surfactant is contained in each of the particular microparticles 2 to 6.

From the comparison of Examples 3 to 5 (comparison of embodiments in which only the content of nonionic surfactant is varied), Examples 3 and 5, in which the content of the nonionic surfactant relative to the content of the particular microparticles (net content of particular microparticles) was 5 mass % or greater, exhibit superior performance on ice and wear resistance performance. Among these, Example 3, in which the content of the nonionic surfactant relative to the content of the particular microparticles (net content of particular microparticles) is 15 mass % or less, exhibits even better performance on ice and wear resistance performance.

From the comparison of Examples 1 to 3 (comparison of embodiments in which the content of the nonionic surfactant relative to the content of the particular microparticles (net content of the particular microparticles) is 10 mass %), Example 3, in which the liquid polymer is the liquid polyisoprene, exhibits even better performance on ice and wear resistance performance.

Meanwhile, Comparative Examples 1 to 4, in which at least one of the particular microparticles, the nonionic surfactant, or the thermally expanding microcapsules is not contained, each exhibit unsatisfactory performance on ice and wear resistance performance.

The invention claimed is:

1. A rubber composition for a tire, the rubber composition, comprising:
   100 parts by mass of a diene rubber;
   from 30 to 100 parts by mass of carbon black and/or a white filler;
   from 1 to 20 parts by mass of silicone-based microparticles that have an average particle size from 5 to 500 μm and that are three-dimensionally crosslinked;
   from 0.1 to 10 parts by mass of a nonionic surfactant; and
   from 1 to 20 parts by mass of thermally expanding microcapsules;

wherein the nonionic surfactant is a compound represented by Formula (d):

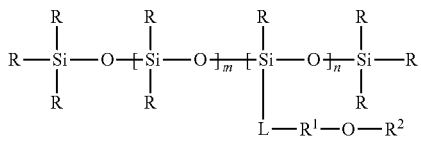

where R represents a hydrocarbon group, L represents a single bond or a divalent linking group, $R^1$ represents a polyalkylene oxide group, $R^2$ represents a hydrocarbon group, and m and n each independently represent an integer of 1 or greater; a plurality of the R moieties may be the same or different; and in a case where n is an integer of 2 or greater, a plurality of the L moieties, a plurality of the $R^1$ moieties, and a plurality of the $R^2$ moieties may be the same or different.

2. The rubber composition for a tire according to claim 1, wherein the diene rubber contains 30 mass % or greater of at least one rubber selected from the group consisting of a natural rubber (NR), an isoprene rubber (IR), a butadiene rubber (BR), an acrylonitrile-butadiene rubber (NBR), a styrene-butadiene rubber (SBR), a styrene-isoprene rubber (SIR), a styrene-isoprene-butadiene rubber (SIBR), and derivatives of each of these rubbers.

3. The rubber composition for a tire according to claim 2, wherein the silicone-based microparticles are obtained by three-dimensionally crosslinking a silicone in a liquid polymer containing the nonionic surfactant.

4. The rubber composition for a tire according to claim 1, wherein the silicone-based microparticles are obtained by three-dimensionally crosslinking a silicone in a liquid polymer containing the nonionic surfactant.

5. A studless tire comprising a tire tread portion produced by using the rubber composition for a tire according to claim 1.

6. A studless tire comprising a tire tread portion produced by using the rubber composition for a tire according to claim 3.

7. A studless tire comprising a tire tread portion produced by using the rubber composition for a tire according to claim 2.

8. A studless tire comprising a tire tread portion produced by using the rubber composition for a tire according to claim 4.

* * * * *